3,491,983
CYLINDER OPERATED PINCH FLOW VALVE
Joseph Van Damme, 19 Livingston Road, and Carmen
 Charles Rendino, 56 Lantern Lane, both of Sharon,
 Mass. 02067
Filed Feb. 7, 1966, Ser. No. 525,608
Int. Cl. F16l 55/14; F16k 15/14, 31/44
U.S. Cl. 251—5                                  3 Claims

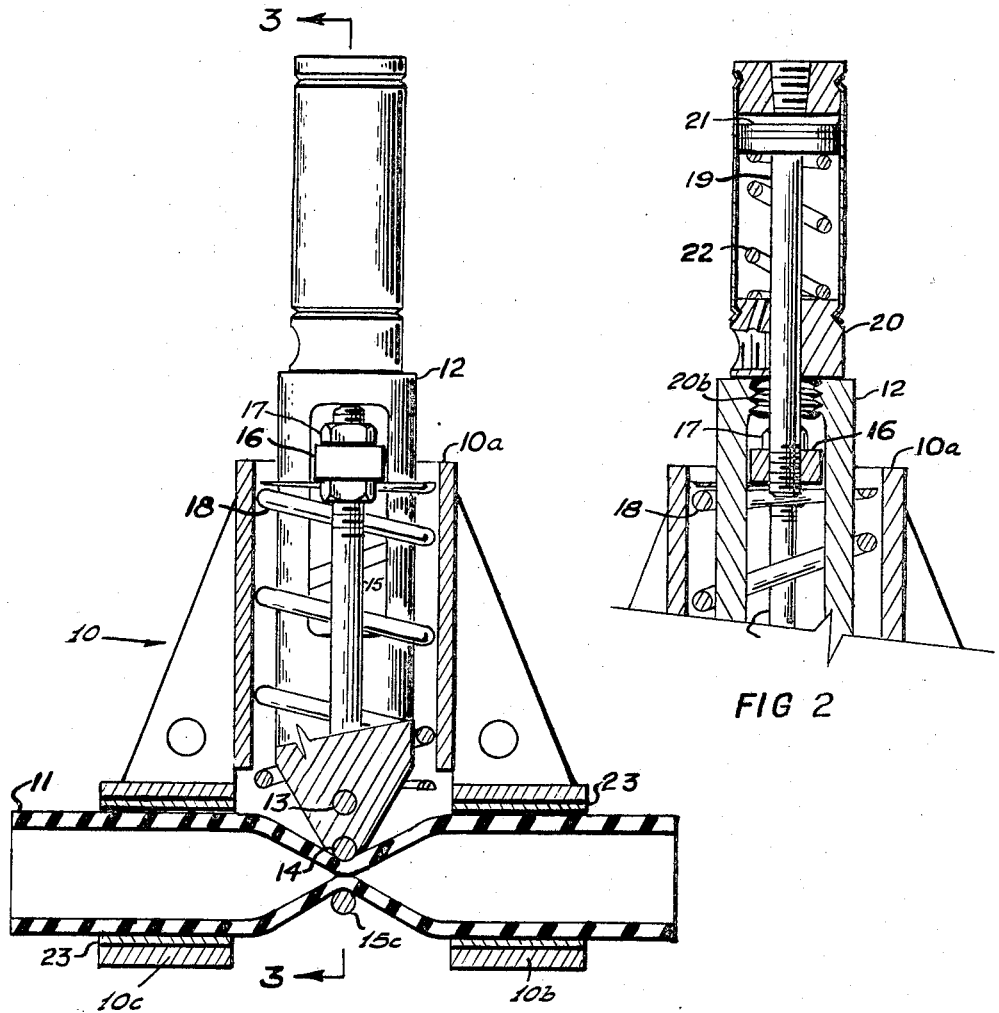
FIG 1
FIG 2
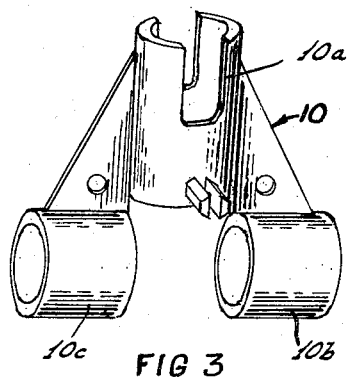
FIG 3

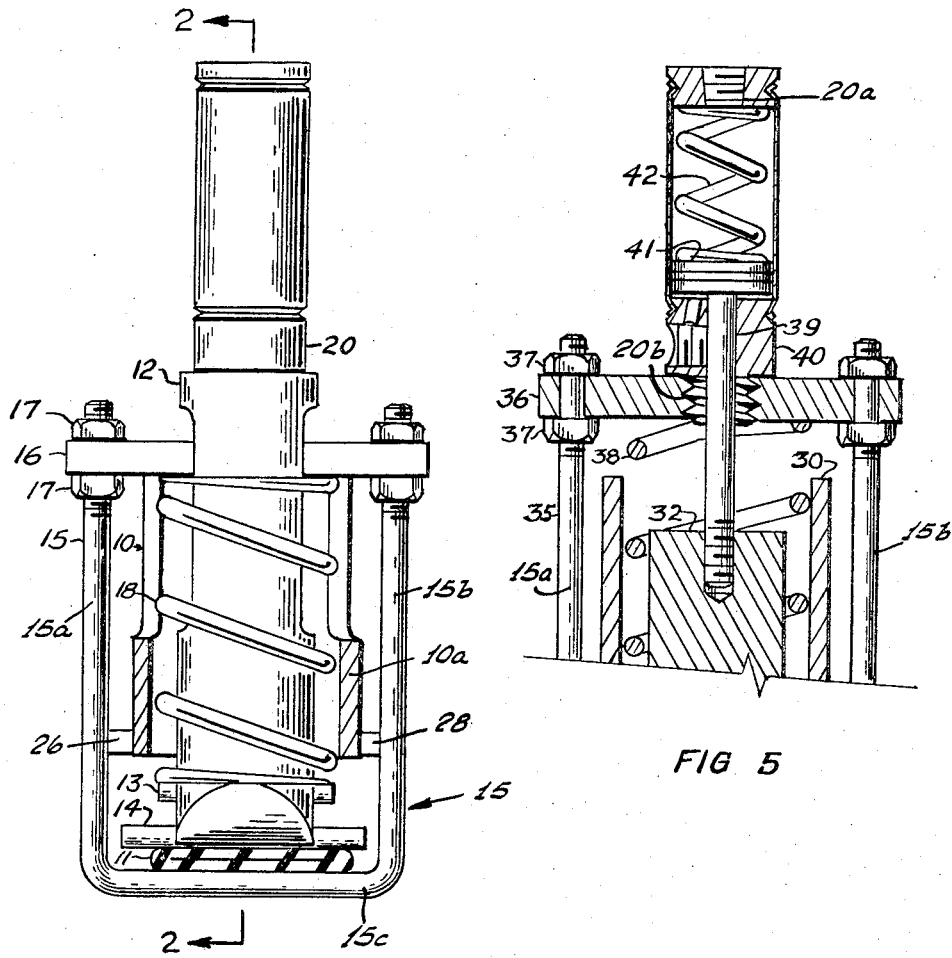

ABSTRACT OF THE DISCLOSURE

A valve is used to close a resilient tube by pinching it, or to open it. It has a housing with two hollow collars to receive said tube, a pressure bar, a plunger movable relative to said housing, a yoke outside of said housing and attached to said pressure bar and extending outside of said tube, a compression spring between said pressure bar and plunger is movable in said housing. Upon movement of said pressure bar, as by tightening the yoke, the tube is constricted between the yoke and plunger. When the piston and rod connected to the pressure bar is actuated, as by air pressure, the yoke is moved away from the tube freeing the latter sufficiently to permit liquid to pass through.

---

Our main object is to provide a valve that receives and normally holds a collapsible tube closed by means of a plunger assembly on one side of the tube and a yoke connected to said assembly and extending to the other side of said tube, which valve can be opened by fluid pressure sufficiently to open said tube to the degree desired.

Referring to the drawings as detailed below:

FIG. 1 is a side elevation, partly in section taken on line 2—2 of FIG. 4, illustrating the completely assembled valve.

FIG. 2 is a further section taken on line 2—2 of FIG. 4, of the upper portion of the valve, viewed from the same point as FIG. 1.

FIG. 3 is a perspective view of the valve frame on a reduced scale.

FIG. 4 is an end elevation of the valve, partly in section taken on line 3—3 of FIG. 1.

FIG. 5 is a section comparable to FIG. 4, but sectionalized similar to FIG. 2, illustrating an alternative construction.

Referring to FIG. 1 through FIG. 4 inclusive, the valve includes a valve frame 10 having a slotted housing 10a and two spaced-apart hollow collars 10b and 10c extending therefrom shown in a perspective view FIG. 3, and a resilient tube 11 passing through the valve collars 10b and 10c. To enable various diameters of resilient tubes 11 to be fitted and used in the same valve body 10, inserts 23 are fitted as needed in the valve collars 10b and 10c. The resilient tube is pinched by a plunger assembly having a plunger 12 carrying a stop pin 13 and a pressure pin 14 on one side, and a yoke 15 on the other side, which has two legs 15a and 15b joined by a connector 15c. The yoke 15 is clamped to a pressure bar 16 by several nuts 17. The pressure bar 16 is forced away from the pin 13 of the plunger assembly by a spring 18 producing the pinching action between pin 14 and the yoke joiner 15c.

An air cylinder, commercially available, has a body 20 having an opening 20a and a screw-threaded extension 20b that is screwed into a threaded hole in the end of the plunger 12, while a piston 21 and rod 19 extend into said cylinder body 20 and the rod is screwed into a threaded hole in the center of the pressure bar 16, in such a way, that air pressure applied through an opening 20a in the cylinder causes the yoke 15 to separate farther from pin 14 of the plunger, and thus allows the resilient tube to resume its normal cylindrical shape.

The body 10 slides freely over the spring 18 thereby repositioning itself to keep the resilient tube 11 centered between the yoke 15 and pin 14.

When the valve is in its normal state with zero air pressure to the cylinder, the valve is shut off tight as shown in FIGS. 1 and 4.

The drawings indicate centering and guiding lugs 26 and 28 for yoke 15 forming part of the valve frame 10. These lugs are only required on certain sizes of valves.

In operation, piston 21, rod 19, pressure bar 16, yoke 15 with nuts 17 move as one unit. Also cylinder body 20, plunger 12, pins 13 and 14, being fastened together, move as a unit. Said spring 18, being compressed between pressure bar 16 and pin 13, and spring 22 also being compressed, tend to separate these two units squeezing said resilient tube 11 into a flattened shape, or closed position. When air pressure is applied to piston 21 the collars 10b and 10c and frame 10 function as a guiding or centering structure for the piston cylinder assemblies which may be considered as self-centering upon the tubing, the springs 22 and 18 are further compressed and the yoke joiner 15c moves away from said pin 14. This permits the tube 11 to open, as it tends to resume its normal shape, allowing liquid to flow through. The housing 10 is held still by the tube 11 which fits snugly in the collars 10a and 10b.

A modified form of the device is shown in FIG. 5, whereby a pressure bar 36 is attached to a cylinder body 40 while a plunger is attached to a piston rod 39 having a piston 41. In this construction the pinching force on the resilient tube 11 is furnished by a spring 38 as before explained; but the air pressure is now applied to the opposite side of the face of the piston 41 by entry through an opening 44 in the side of said cylinder body 40.

We claim:

1. A valve comprising a housing and a hollow collar extending therefrom adapted to receive a collapsible tube, said housing having a laterally extending slot extending from an end extremity thereof, a fluid actuated plunger assembly freely mounted for movement within said housing relative to said tube, said plunger assembly comprising a cylinder and a piston movable therein having a piston rod, a pressure bar connected for movement with said piston rod and extending laterally through said slot and to the exterior of said housing, a yoke comprising legs connected at opposite ends of said pressure bar exterior of said housing and a connector leg therebetween adapted to be disposed on one side of said collapsible tube, said cylinder having a clamping surface adapted to be disposed on the opposite side of said tube for collapsing said tube therebetween, a spring mounted within said housing to bias said yoke and cylinder into a first valving position, said housing being relatively fixed to said tube through said collar whereby fluid pressure applied to said plunger assembly effects relative movement of said cylinder and piston to move same to a second valving position against the bias of said spring.

2. A valve as set forth in claim 1, and another hollow collar spaced laterally from the first collar, the openings in said collars being in alinement.

3. A valve as set forth in claim 2, said collars being integral with said housing and extending below and in opposite directions laterally of said housing.

References Cited

UNITED STATES PATENTS

| | | | |
|---|---|---|---|
| 2,600,493 | 6/1952 | Farris | 251—5 XR |
| 2,659,387 | 11/1953 | Farris | 251—5 XR |
| 2,770,439 | 11/1956 | Stafford et al. | 251—5 XR |
| 3,018,793 | 1/1962 | Aagaard | 251—5 XR |

FOREIGN PATENTS

| | | |
|---|---|---|
| 25,014 | 12/1893 | Great Britain. |
| 693,028 | 6/1953 | Great Britain. |

WILLIAM F. O'DEA, Primary Examiner

RICHARD GERARD, Assistant Examiner